US006927902B2

(12) United States Patent
Schoeppe

(10) Patent No.: US 6,927,902 B2
(45) Date of Patent: Aug. 9, 2005

(54) LASER SCANNING MICROSCOPE

(75) Inventor: Guenter Schoeppe, Kunitz (DE)

(73) Assignee: Carl Zeiss Jena GmbH, Jena (DE)

( * ) Notice: Subject to any disclaimer, the term of this patent is extended or adjusted under 35 U.S.C. 154(b) by 106 days.

(21) Appl. No.: 10/313,978

(22) Filed: Dec. 6, 2002

(65) Prior Publication Data

US 2003/0142399 A1 Jul. 31, 2003

(30) Foreign Application Priority Data

Dec. 7, 2001 (DE) .......................................... 101 60 172

(51) Int. Cl.$^7$ .............................................. G02B 21/00
(52) U.S. Cl. ................................... 359/368; 250/201.3
(58) Field of Search ................................ 359/368, 385, 359/389, 201, 202; 356/614–624; 250/206, 206.1, 206.2, 234, 235, 236, 201.3

(56) References Cited

U.S. PATENT DOCUMENTS 6,037,583 A     3/2000  Moehler
6,355,919 B1 *  3/2002  Engelhardt ............... 250/201.3
6,677,579 B2 *  1/2004  Engelhardt .................. 250/234

FOREIGN PATENT DOCUMENTS

DE    197 32 668 A1    2/1999
DE    199 06 763 A1    8/2000

* cited by examiner

Primary Examiner—Mark A. Robinson
Assistant Examiner—Alessandro Amari
(74) Attorney, Agent, or Firm—Patterson, Thuente, Skaar & Christensen, P.A.

(57) ABSTRACT

In a laser scanning microscope comprising a deflecting device, which is provided for variable deflection of a laser beam about a deflection angle, and a control unit, which controls the deflecting device via a control signal and measures, at least temporarily, a present deflection angle value, it is envisaged that, at the time of measurement of the present deflection angle value, a testing structure, which comprises at least one structural element whose position is assigned to a predetermined deflection angle value, is arranged downstream of the deflecting device, a detecting device is provided, which emits a detection signal when the laser beam is directed to the structural element, and the control unit assigns the present control signal to the predetermined deflection angle value upon reception of the detection signal.

6 Claims, 3 Drawing Sheets

LASER SCANNING MICROSCOPE

The invention relates to a laser scanning microscope comprising a deflecting device, which deflecting device is arranged for variable deflection of a laser beam about a deflection angle, and comprising a control unit, which controls the deflecting device via a control signal, as well as to a laser scanning microscopy method, wherein a laser beam is variably deflected about a deflection angle by controlling a deflecting device.

BACKGROUND OF THE INVENTION

In laser scanning microscopy, an area of an object is illuminated in a raster-like manner and scanned by a laser beam point by point. In most cases, a parallel laser beam, which is typically 10 mm in diameter, is deflected for illumination according to a desired pattern, about a deflection angle—e.g. in a similar manner as an electron beam in a Braun tube—by using a deflecting device. The deflected laser beam is then focussed by an optical system in an intermediate image plane of the laser scanning microscope and subsequently imaged by an objective onto or into the object.

The focused laser beam interacts with the object, with reflected radiation or fluorescence radiation being generated, which returns along the same path taken by the laser beam during illumination. Said radiation is then deflected into a detector beam path by a beam splitter arranged, in most cases, preceding the deflecting device in the illumination direction, there being arranged, within the detector beam path, at least one imaging system which focusses the detected beam in a further image plane. Depending on the particular application, there may be several detector beam paths, each receiving a predetermined spectral range of the radiation coming from the object.

The deflecting device causes a raster-like movement of the focussed laser beam over the object surface area, with information on the present state of the deflection, i.e. on the present position of the focussed laser beam in the object surface area, being required in order to correctly assign, at this point in time, the radiation received in the detector beam path to an image point. Thus, the precision of said deflection affects the geometric correspondence of the scanned image and the object; in this connection, one also speaks of image linearity.

In this case, the problem arises that, the deflecting device, which may be realized, for example, in the form of two tiltable mirrors, follows a predetermined deflection behaviour, which is usually determined by a control signal, only in a more or less precise manner due to inertia and various disturbances. Since, at the same time, a high operating speed, i.e. a high scanning frequency, is desired for the deflecting device, the deflecting device needs to satisfy certain minimum requirements in order to guide the focussed laser beam over the object surface area at a constant high speed in a precise manner.

Naturally, in doing so, a characteristic as linear as possible is pursued for the deflecting device. High scanning frequencies may be achieved in a particularly easy manner, if a reciprocating movement of the laser beam over the object is utilized for scanning. This is referred to as bidirectional scanning. For this purpose, for example, each tiltable mirror of a deflecting device comprising two tiltable mirrors is usually controlled via a triangular signal. Thus, one tiltable mirror effects deflection along a line of the object surface area, with one such line corresponding to a half-cycle of the triangular signal, e.g. from the minimum value to the next maximum value, and the other tiltable mirror deflects perpendicular to the line direction, with the aforementioned half cycle of the triangular signal for this tiltable mirror corresponding to a passage of the laser beam over the entire object surface area, for example, from top to bottom. Of course, the second tiltable mirror, which is required to move much more slowly, may also be controlled by a sawtooth signal.

The phases and amplitudes of the control signal, which is thus composed of two triangular signals, accordingly have a direct effect on the linearity of the movement of the focussed laser beam over the object surface area. However, in this connection, it is mandatory that the deflecting device, e.g. the aforementioned tiltable mirrors, exactly follow the control signal, which, however, is hardly ever the case. For example, if oscillating mirrors are used in the deflecting device, as is common practice in laser scanning microscopes, said mirrors can follow a triangular signal only to a limited extent. Moreover, triangular signals may be regarded as the Fourier synthesis of odd harmonics (multiples) of the deflection frequency. However, unavoidable phase delays and lower transfer factors of higher harmonics result in non-linear movements of the tiltable mirrors.

In order to increase the precision with which the actual deflection by the deflecting device follows a desired movement, DE 197 02 752 A1 suggests to provide a feedback device on the deflecting device in order to measure the position of the tiltable mirrors used in the deflecting device. The condition of the deflecting device is thus detected and used in combination with an anticipatory control for open-loop control of desired characteristics.

In order to determine the dynamic characteristics of the deflecting device, the deflecting device is first controlled with pure sinus signals, with a wide frequency range being swept and the amplitude and phase of the movement of the tiltable mirrors being measured. Using a Fourier series, a control signal may then be synthesized by including, in the individual Fourier coefficients, the phase rotation of the frequency of the respective coefficient as an offset and the inverse value of a transmission factor of the respective coefficient of the deflecting device for the corresponding frequency as part of the amplitude. In this way, the control signal is predistorted such that the movement of the deflecting device ultimately approaches the desired movement as closely as possible.

However, since the deflecting device comprising the control device for controlling cannot be considered to be a linear system in this case, so that linear superposition of the aforementioned Fourier coefficients accordingly does not lead to an optimal result for said movement, according to DE 197 02 752 A1, any possible residual error remaining is determined for the individual coefficients and compensated for by a further predistortion of the control signal, in a third step reverting to the feedback device.

This method, which involves extensive calculations, achieves high precision at deflection frequencies below 1 kHz. In order to obtain full correspondence of the forwardly scanned and backwardly scanned lines in the bidirectional scan, the movements, however, have to be symmetrical with respect to the points of reversal. There is, thus, the problem that, due to a lack of symmetry, an offset between the image lines picked up during a forward rotation of the tiltable mirrors and the image lines picked up during a countercurrent backward rotation cannot be avoided. Such offset limits the admissible deflection frequency, so that, for the time required to take a picture, which is naturally desired to be kept as short as possible, a lower limit is set, if image linearity is not to be adversely affected. For an image format of 512×512 pixels, it has turned out that an offset of 0.2 pixels for adjacent image lines can just be tolerated.

SUMMARY OF THE INVENTION

Therefore, it is an object of the invention to improve a laser scanning microscope and a laser scanning microscopy method of the above-mentioned type such that high image linearity is achieved also at high deflection frequencies.

According to the invention, this object is achieved, in a laser scanning microscope of the aforementioned type, by providing a measurement device which measures, at least temporarily, a present deflection angle value by detecting the position of the laser beam after it has passed the deflecting device.

The invention is based on the finding that the above-mentioned problems of an offset are caused by differences in transit time from the position of the tiltable mirrors measured by the feedback device and the point on the object surface actually detected in the detector beam path. Therefore, the measurement of the deflection angle value is now no longer effected by detecting the condition of the deflecting device itself, as has hitherto been the case, for example, in the prior art using a known position measurement of a tiltable mirror, since this does not allow to achieve the required precision for synthesis of the control signal.

Instead, a completely new approach is taken by the invention, namely by detecting the position of the deflected laser beam itself using a detecting device, since said position is ultimately decisive for the function of the laser scanning microscope or laser scanning microscopy method.

In this connection, the invention measures the actual deflection angle value directly and no longer indirectly via the position of the deflecting device. Consequently, the aforementioned differences in transit time no longer occur to a disturbing extent. Also, other systematic errors of measurement, which occur in known position feedback systems, such as, for example, elastic deformations of mirrors or mirror axes of a deflecting device, no longer play a role and do not affect the quality of closed-loop control. Moreover, the measurement of the laser beam position according to the invention allows a calibration of the scanning of the object field to be achieved.

In a convenient embodiment, it is envisaged that the measurement device comprise a testing structure which includes at least one structural element, whose position is assigned to a predetermined deflection angle value, said testing structure being arranged downstream of the deflecting device at the time of measurement, and that it comprise a detecting device emitting a detection signal when the laser beam is directed to the structural element, with the control unit assigning the present control signal to the predetermined deflection angle value upon reception of the detector signal.

In laser scanning microscopes, a scanning objective is usually provided which, while generating an intermediate image, directs the laser beam onto the object to be scanned. In said intermediate image, the laser beam has its minimum beam cross-section. Therefore, the deflection angle can be measured with particular precision if detection is effected in this intermediate image plane or in a plane being conjugated thereto. In an advantageous further embodiment of the invention, there is, therefore, provided a scanning objective arranged downstream of the deflecting device, said objective enabling a laser beam supplied by the deflecting device to be directed to an object to be scanned, and the testing structure is movable into an intermediate image plane or lies in a plane being conjugated thereto.

Since conventional deflecting devices usually have a certain stability over time, the measurement of the deflection angle values need not be effected each time a picture is taken; it suffices to move the calibrating object into the intermediate image plane at certain intervals.

For this purpose, the calibrating object may be designed to be suitably movable. For example, it may be slided into the intermediate image plane in the manner of a slide transport mechanism or it may be swivelled or folded into the intermediate image plane by a swivel mechanism. In this case, it is essential only that the calibrating object be movable into the intermediate image plane and that no interference lying in the used spectral range occur in the beam path during normal microscopy of an object. Moving the testing structure into the intermediate image plane then represents a calibrating step preceding the actual microscopy of the object.

Further, it is possible to provide a mirror arranged downstream of the scanning objective, which mirror may be swivelled-in such that, in the swivelled-in condition of the mirror, the testing structure lies in the intermediate image plane of the scanning objective.

For particularly strict, requirements, however, the calibrating object may also be constantly arranged in a plane being conjugated to the intermediate image plane of the scanning objective. For this purpose, there is advantageously provided a dichroic first beam splitter arranged downstream of the scanning objective, which beam splitter splits a laser beam of a predetermined wavelength and passes it to the testing structure which is arranged in a plane being conjugated to the intermediate image plane of the scanning objective. In doing so, the beam splitter splits off spectral components which are not needed for the laser scanning microscopy of the object and guides them to the testing structure. This concept allows the desired image linearity to be achieved even for low stability of the deflecting device or for high precision requirements, because it enables continuous measurement.

In principle, there are many possible designs for the testing structure. It is only essential that it should enable detection of whether the laser beam impinges on the structural element. In a particularly simple realization of the testing structure, the structural element is a slot or a bar, and the detecting device detects the radiation transmitted or reflected by the testing structure. If the structural element is provided as a slot, the fact that radiation is transmitted through the testing structure shows that laser radiation is incident on the structural element. The exact opposite applies if the structural element is provided as a bar. In this variant, it is particularly convenient to place a photodetector, which detects all radiation passing through the testing structure, behind the testing structure, possibly with interposition of a collective lens.

A particularly compact design is achieved if the measurement device comprises a photoreceptor having spatial resolution. In this case, the detector device may assume some functions of the testing structure to the effect that the spatial resolution is realized, in part or completely, by the spatial resolution of the photoreceptor. A particularly simple design is achieved using a CCD camera. Each pixel of such CCD camera corresponds to a structural element of the testing structure. Of course, the CCD camera then has to be read out in manner synchronized with the control of the deflecting device. Preferably, the read-out is effected in reversal phases of the laser beam between its forward and backward movements.

A particularly easy-to-manufacture testing structure is obtained if the structural elements reflect laser beams and the detector device detects radiation reflected by the testing structure. The testing structure may then be provided, for example, as a line grid, with the individual lines of the grid being reflective elements, for example, metallized surfaces of a glass carrier. In this case, for example, the use of known rulers for the testing structure, such as those used in linear measurement devices operating on the transmitted light principle, can be used.

In order to minimize the time offset between measurement of the deflection angle value and the actual detection of the radiation reflected or emitted by the object to be microscoped, it is convenient to model the detection principle according to which the position of the laser beam is detected as exactly as possible on the detector beam path of the laser scanning microscope. Delays and idle times will then be identical. In a preferred further embodiment of the invention, it is envisaged that the detecting device comprises a pinhole lens, which picks up radiation reflected by the testing structure, said radiation reaching the pinhole lens via the scanning objective and the deflecting device. In this embodiment, the time offset between measurement of the deflection angle value and detection of radiation emitted by a pixel of the object to be microscoped is determined merely by possible differences in optical path length, which, however, are normally negligible.

In the embodiment comprising the dichroic beam splitter, a similar beam splitter is then conveniently arranged preceding the scanning objective in the illumination direction, which beam splitter guides radiation reflected by the testing structure to the detecting device.

The desired image linearity may then be achieved particularly easily by measuring the deflection angle value, if the deflecting device comprises two tiltable mirrors controlled with regard to the deflection angle, and the control unit influences the control signal, as a function of the measurement of the deflection angle, so as to achieve optimal image linearity.

The position and number of the structural elements on the testing structure is, in principle, freely selectable. Thus, a single, line-type structural element suffices to enable exact setting of the zero position of the laser beam and to compensate, to a certain extent, for any offset of the zero position. Of course, particularly exact measurement is obtained by providing a plurality of structural elements, since this allows a plurality of deflection angle values to be measured. For this purpose, it is convenient to use a testing structure comprising a plurality of line-type structural elements, which are preferably equidistantly spaced from each other and arranged along a deflection direction of the deflecting device. In this case, the line-type structural elements conveniently cover the maximum deflection range.

The number of line-type structural elements equidistantly spaced from each other is essential for the number of locations which may then be used to analyze the movement of the laser beam over the deflection angle range. High linearity requirements often necessitate synthesis of the control signal using five to ten odd-number Fourier coefficients, i.e. it must be possible to take into account higher harmonics of up to 19 times the deflection frequency.

In doing so, at least four equidistant locations per wavelength are required at the highest frequency, i.e. one needs 76 locations. Therefore, the testing structure preferably enables at least 76 equidistant locations for one full cycle, i.e. at least 38 structural elements will be equidistantly distributed over the entire image width.

Moreover, since in many cases starting conditions are present which cause an offset of more than one location distance, i.e. more than one structural element distance, the testing structure advantageously comprises further a centrally arranged mark, which differs from the marks at other locations, for example, in the width or the length of the line-type structural element.

According to the invention, the above-mentioned object is achieved, in a laser scanning microscopy method as mentioned above, in that the deflection angle is measured by detecting the position of the laser beam downstream of the deflecting device.

The use of the aforementioned testing structure is also convenient for this purpose, wherein, in in a testing structure comprising a plurality of line-type structural elements equidistantly spaced from each other and arranged along a deflecting direction, the deflection is adjusted along the deflection direction such that the laser beam is successively directed to all of said structural elements. In the case of equidistantly spaced structural elements and a linear beam deflection movement, the time interval at which light impinges on the structural elements is then constant.

By assigning the deflection angle values to the control signal, i.e. by assigning the setting of the deflection to the corresponding deflection angle values, which assignment may be obtained in the aforementioned manner, a calibration of the deflecting device is advantageously achieved.

For this purpose, the procedure mentioned in DE 197 02 572 A1 may first be used, although now the control initially provided therein of the deflecting device by sinus functions with increasing frequencies no longer uses the feedback device provided on the deflecting device, but the deflection angle values are measured using the method according to the invention. Thus, a frequency response of the deflecting device is determined which is free from errors caused by differences in transit time during measurement of deflection angles relative to an image signal. The frequency response is then accordingly taken into consideration, when controlling the deflecting device, in order to achieve the desired image linearity.

On the basis of the frequency response, Fourier coefficients may then be advantageously determined by means of Fourier analysis, which coefficients are then used to control the deflecting device in order to achieve a change in the reciprocating deflection being uniform in time.

In such Fourier analysis, from the determined frequency response of the deflecting device, the odd-number coefficients may first be detected with regard to amplitude information and phase information. Subsequently, a rough correction of the phase and amplitude of the individual odd-number Fourier coefficients is successively effected in that differences between the measurement of the deflecting angle in forward and backward movements of the laser beam over a line-type structural element of a testing structure are detected, said element lying at the image center.

Next, fine adjustment of the odd-number Fourier coefficients may then be carried out by effecting a corresponding evaluation by Fourier analysis for further line-type structural elements lying outside of the image center, said evaluation again including the differences between deflection angle values measured in the forward and in the backward direction.

Finally, even-number Fourier coefficients may then be taken into account which also cause linearity distortions.

For further improvement of precision, additional linearization may be achieved by varying the Fourier coefficients, the necessary information concerning magnitude and direction of the variation of said coefficients being obtained by a Fourier analysis of the deviations from linearity. Finally, fine adjustment of all phase and amplitude components to optimal linearity and/or minimal offset between forward-scanned and backward-scanned deflection angle values via evaluation by Fourier analysis of the image locations of the line-type structural elements is possible in order to achieve optimum image linearity.

In laser scanning microscopes, a so-called electrooptical zoom may be realized by varying the amplitude of the deflection. Since this clearly changes the properties of control, it is convenient to perform the measurements of deflection angle values according to the invention for several different deflection amplitudes offset against each other by a factor and to separately store Fourier coefficients for each deflection amplitude. For example, six different deflection amplitudes offset against each other by factor $0.5*2^{0.5}$ may be used, each of them corresponding to one zoom factor. For this purpose, the testing structure conveniently provides a group of linetype structural elements for each zoom factor, said structural elements being equidistantly distributed over the deflection range provided for the respective zoom factor, the same number of line-type structural elements being used in each case in order to ensure the above-mentioned required number of locations.

DESCRIPTION OF THE FIGURES

The invention is explained in more detail below, by way of example, with reference to the Figures wherein.

DETAILED DESCRIPTION OF PREFERRED EMBODIMENTS

Figure 1:
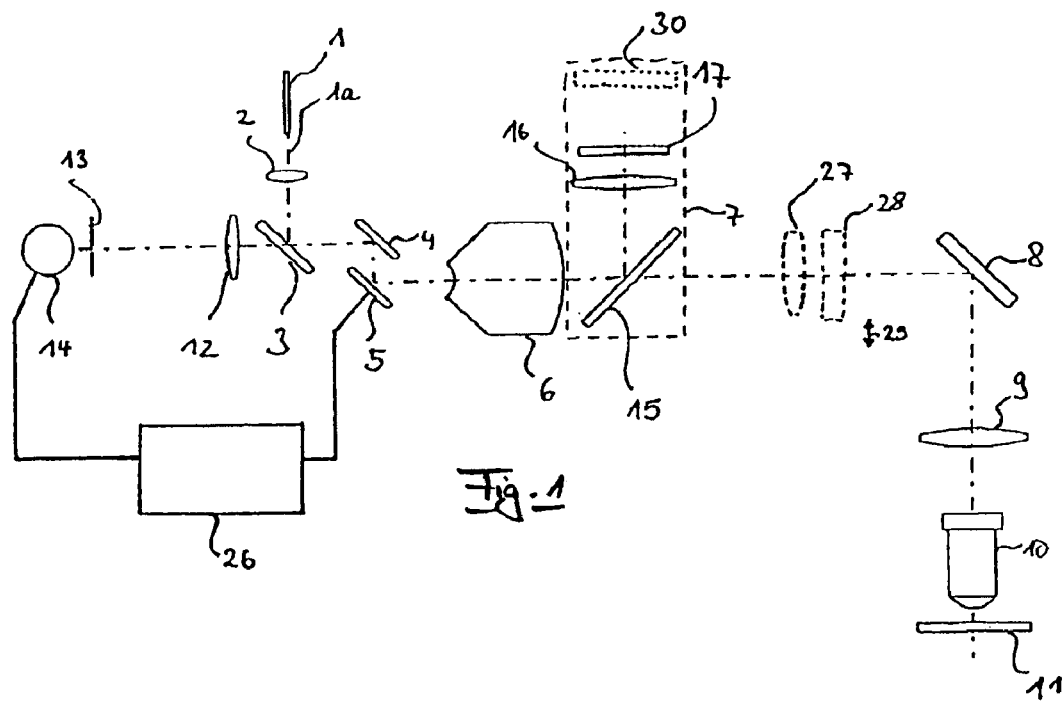
FIG. 1 shows a schematic representation of a laser scanning microscope comprising a device for measurement of the deflection angle.

FIG. 1 shows a laser scanning microscope which can be calibrated regarding the deflection of a laser beam. The laser scanning microscope comprises a fiber 1 from which a diverging laser beam 1a exits. Said laser beam is focussed to form a parallel beam using a collimator 2, and impinges on a main beam splitter 3 which reflects the parallel laser beam 1a in the direction of a biaxial deflecting device formed by two scanner mirrors 4 and 5, whose axes are crossed (for the sake of simplicity, these are shown in one plane in FIG. 1). The laser beam 1a passes from the scanner mirrors to a scanning objective 6, which guides the laser beam in the direction of an object. A measurement device 7, which will be explained in more detail below, is arranged downstream of the scanning objective 6.

A deflecting mirror 8 picks up a laser beam supplied by the scanning objective 6 and directs it to a tube lens 9, which, together with a subsequently arranged objective 10, focusses the laser beam on an object 11.

In the object 11, there is interaction between the laser beam 1a and the object, with reflection or emission of fluorescence radiation taking place. This radiation generated in the object 11 passes back again along the beam path in the opposite direction of the illumination direction, i.e. it is picked up by the objective 10 and passes from the tube lens 9 via the deflecting mirror 8 to the scanning objective 6 and is guided by the scanner mirrors 5 and 4 to the main beam splitter 3. At least part of the radiation coming from the object 11 passes through the beam splitter 3, so as to be picked up by a detector 14 via a pinhole lens 12 and a pinhole aperture 13.

The scanner mirrors 4 and 5 are controlled in a suitable manner for raster-scanning of an object surface area on the object 11, as will be explained hereinbelow. For control of the deflecting device, the measurement device 17 is provided, by means of which the value of the deflection angle about which the laser beam 1a is deflected by the scanner mirrors 4 and 5 can be measured in order to obtain an exact assignment between the control of the scanner mirrors 4 and 5 and the deflection angle. In doing so, in particular, the dynamic characteristics of the scanner mirrors 4 and 5, are taken into account by suitable control to result in a desired course of the laser beam over the object 11.

The measurement device 7 comprises a dichroic beam splitter 15 which couples out radiation of a certain wavelength region from the laser beam 1a. In said wavelength region no or only minor interactions, or interactions which are not of interest in an evaluation are excited by the laser beam 1a in the object 11. The component of the laser beam 1a coupled out by the dichroic beam splitter 15 is focussed on a test grid 17 by a field lens 16. Said test grid 17 comprises spatially distributed structural elements, each of which corresponds to a certain deflection angle value and is thus illuminated by the laser beam, which the dichroic beam splitter 15 couples out, only upon specific control of the scanner mirrors 4 and 5.

The test grid 17 may have differently designed structural elements. In a first variant, said structural elements are reflecting lines, so that back reflection to the dichroic beam splitter 15 takes place only if the scanner mirrors 4 and 5 direct the laser beam to a structural element.

The assembly of test grid 17, field lens 16 and dichroic beam splitter 15, in this case, is arranged relative to the scanning objective such that the test grid 17 is located in a plane being conjugated to the intermediate image plane of the scanning objective 6. Radiation reflected by a structural element passes via the field lens 16 and the dichroic beam splitter 15 to the scanning objective 6 and from there, via the scanner mirrors 4 and 5, to a beam splitter (not shown) serving the same function as the main beam splitter 3 and preferably designed such that it suitably separates, in a direction opposed to the radiation direction, from the radiation coming from the object 11 the very wavelength component which the dichroic beam splitter has split from the laser beam 1a. Said beam splitter then has the same properties as the dichroic beam splitter 15 and ensures that the radiation reflected by a structural element of the test grid 17 passes into a separate detector beam path which is part of the measurement device, said detector beam path, analogous with the above-described detector beam path, comprising a pinhole lens, a pinhole aperture and a detector.

Radiation coupled in to the beam path again in the opposite direction of the illumination direction by the dichroic beam splitter 15 and reflected by a structural element of the test grid 17 is finally detected by a detector. If, by means of said detector, the measurement device detects a reflection from a structural element 17, the deflection angle value corresponding to said structural element can be assigned to the present control of the scanner mirrors 4 and 5, thus achieving an exact position feedback.

Said position feedback is, compared with normal operation of the laser scanning microscope, wherein interactions on the object 11 result in detected radiation, free from any delays, so that the time characteristics of the scanner mirrors 4 and 5 can be determined using the test grid 17. The time characteristics thus known are then utilized, in a manner described hereinbelow, to control the scanner mirrors 4 and 5 during microscoping of an object 11.

Figure 2:
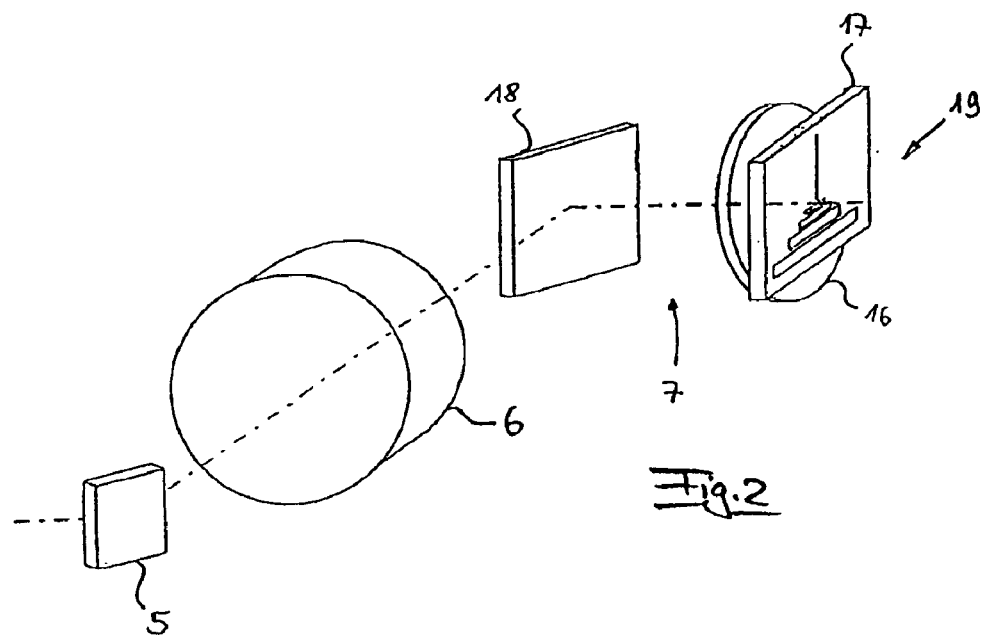
FIG. 2 shows a perspective view of components of a laser scanning microscope.

FIG. 2 shows a variation of the measurement device 7, wherein a swivel mirror 18 is provided instead of the dichroic beam splitter 15, said swivel mirror 18 deflecting the laser beam 1a coming from the scanning objective 6 such that it will impinge on the test grid 17 now located in the intermediate image plane 19 of the scanning objective 6. If the swivel mirror 18 is swivelled in, no more radiation can impinge on the object 11. Instead, calibration of the scanner mirrors 4 and 5 takes place. For the actual microscoping, the swivel mirror 18 is swivelled out again.

In a further embodiment, instead of the swivel mirror 18, the test grid, together with its field lens arranged in front of it, can be directly introduced into the beam path downstream of the laser scanning microscope (shown in broken lines in FIG. 1). For this purpose, a test grid 28 with a field lens 27 arranged in front of it, is moved into the beam path in the direction of the arrow 29, for example by a swivelling or sliding mechanism.

FIG. 1 shows, in dotted lines, an optional embodiment of the measurement device concerning the detection of radiation impinging on a structural element of the test grid 17. For this purpose, the test grid 17 is designed to be transparent, with the transmission properties of a structural element differing from the other transmission characteristics of the test grid 17. Accordingly, a structural element may be provided, for example, as a transmitting slot or as an absorbing bar. In this embodiment, a flat, photosensitive element 30 is arranged behind the test grid 17, which element 30 picks up the radiation transmitted through the test grid 17 and thus allows to indicate whether or not a laser beam is directed onto a structural element. Conveniently, there is arranged between the test grid 17 and the element 30 an optical system which images a plane lying between both tiltable mirrors onto the element 30, so that differences in sensitivity of the element across its surface do not result in errors. The test grid 17 may be omitted if a CCD detector which allows spatial resolution is used as element 30.

Figure 3:
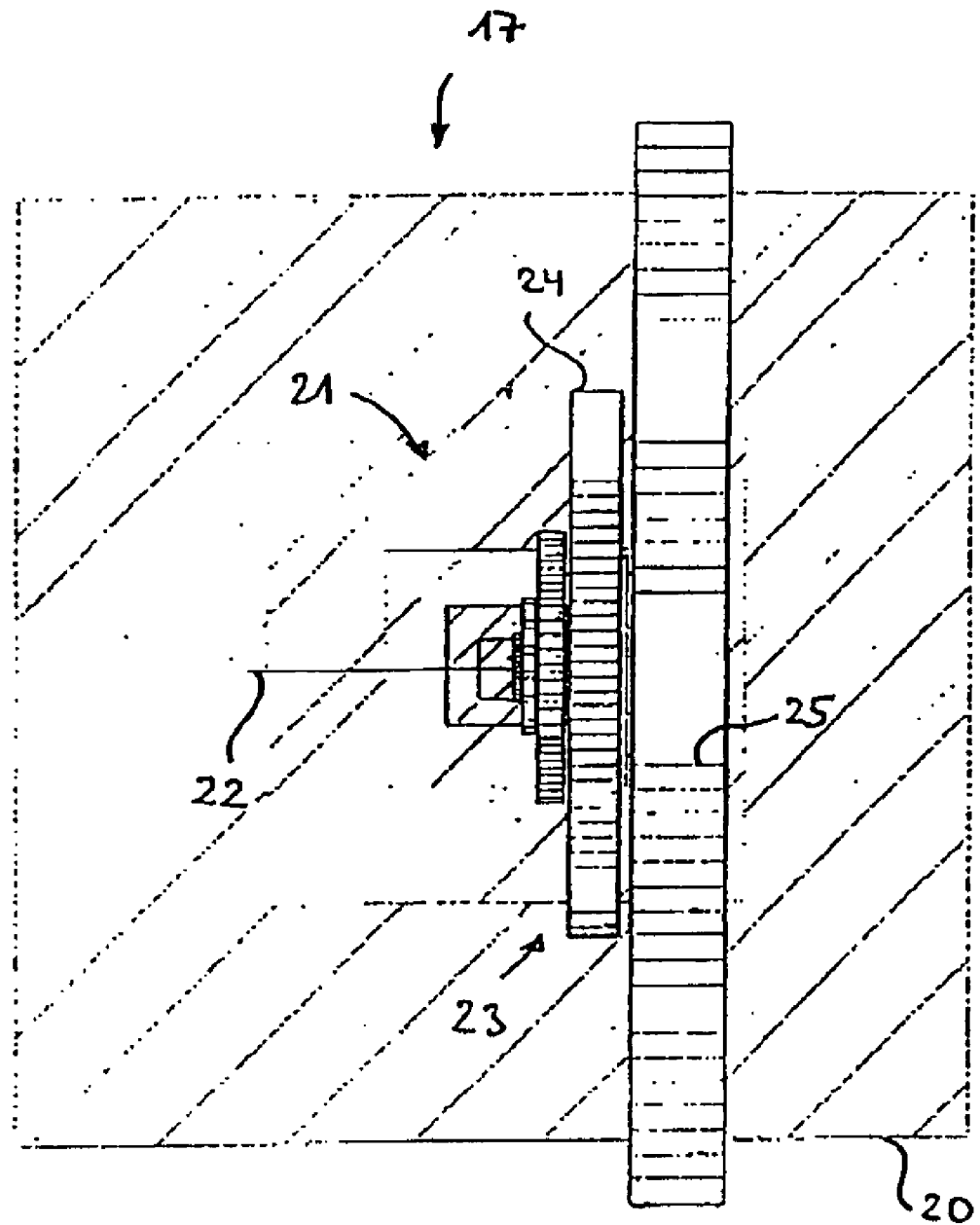
FIG. 3 shows a simplified representation of a testing structure used for measurement of the deflection angle values in the device of FIGS. 1 and 2.

The structure of the test grid 17 is shown in FIG. 3 by way of example. The test grid 17 (also indicated at 20 in FIG. 3) comprises a testing structure 21 which consists of a reflective coating applied on a support, for example a glass support. Said reflective coating has line-type elements. A center mark 22 defines the center of the test grid 17 and corresponds to the central axis of an object field to be scanned in the laser scanning microscope. In addition to the center mark 22, a line grid structure 23 comprising individual line grids 24 is provided, each of said grids comprising 40 to 80 reflective grid lines 25. The grid lines 25 in the individual line grids 24 are differently spaced so that the individual line grids have different grid constants. Each line grid 24 covers a different deflection angle range and, as will be explained hereinbelow, is assigned to a zoom factor of the laser scanning microscope.

Figure 4:
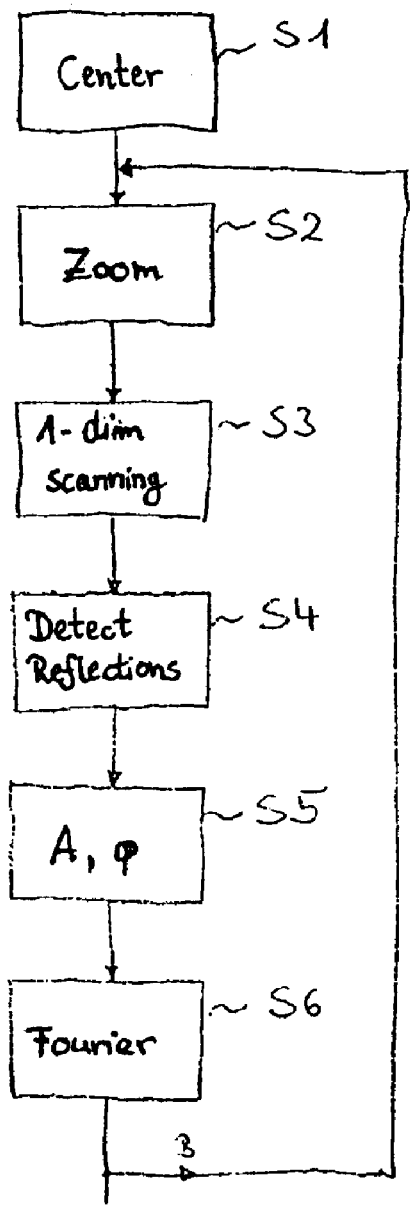
FIG. 4 shows a block diagram of a method for calibrating a laser scanning microscope.

A control device 26 is connected to the scanner mirrors 4 and 5 as well as to the detector 14 and the detector of the measurement device via lines (not further shown) and effects calibration of the movement of the scanner mirrors 4 and 5 according to the method described below and shown in FIG. 4:

Said calibration is effected separately for each scannner mirror 4 and 5; the following description refers to the calibration of the scanner mirror 4. Which scanner mirror is being calibrated depends on the arrangement of the test grid 17, since the lines need to be located as perpendicular as possible to the direction of the deflection caused by the scanner mirror to be calibrated.

When the test grid is arranged in the beam path, i.e. when the swivel mirror 18 is swivelled in or when the test grid 28 is withdrawn, the scanner mirrors 4 and 5 are controlled via a control signal. In this case, control is effected via a control signal synthesized by means of Fourier coefficients. The Fourier coefficients may be obtained in a manner described hereinbelow. In this case, the Fourier coefficients cause distortion of the control signal, said distortion ideally being such that the movement of the scanner mirror 4 results in a desired deflection course of the laser beam.

Then, in a step S1, the reflections at the center mark 22 are detected and the control values of the scanner mirror 4 which are assigned to said detection are stored. By detecting the center mark in step S1, a rough phase correction of the individual odd-number Fourier coefficients of the control signal of the scanner mirror 4 may be successively effected by evaluating the difference between the detection of the center mark during a forward swivel motion and during a backward swivel motion of the scanner mirror 4.

Upon said first, rough phase correction, the laser beam is directed to a line grid 24. Which of the plurality of line grids of the testing structure 17 is used for this purpose depends on a zoom factor setting. A laser scanning microscope enables enlargement of a specific detail of an image in an electrooptical manner by limiting the deflection range of the laser beam. In order to dispose of an optimal number of locations for the subsequently performed Fourier analysis, that line grid 24 is selected which still covers the deflection angle range covered by the selected zoom factor (step S2).

Next, a one-dimensional scan using the scanner mirror 4 is effected in a step S3, with a fine adjustment of all odd-number Fourier coefficients being effected by evaluating, by Fourier analysis, the differences between the detected locations of the individual grid lines 25 of the line grid 24 between the forward and the backward motion of the scanner mirror 4.

For this purpose, in a step S4, the reflections are detected and the corresponding amplitude and phase information is determined in a step S5. Then, in a step S6, the even-number coefficients causing linearity distortions are determined by Fourier analysis. In doing so, it is validated whether the movement of the laser beam over the deflection angle range valid for this zoom factor, which movement is detected by means of the reflections at the grid lines 25, includes Fourier frequencies which interfere with the desired movement. These components are compensated for by adding suitable coefficients. During analysis, higher harmonics of up to 19 times the scanning frequency are taken into account, so as to cover five to ten odd-number Fourier coefficients.

In a subsequent optimizing operation for further linearization (not represented in FIG. 4), a variation of the amplitude of the Fourier coefficients takes place, with the information pertaining to magnitude and direction of said variation being obtained by a Fourier analysis of the differences in linearity from the measured course of the deflection angle values to the desired value.

Finally, in a further evaluation by Fourier analysis an evaluation of the detected image locations of the grid lines 25 enables fine adjustment of the phase and amplitude components of the control signal, which is synthesized from the Fourier coefficients, with respect to optimal linearity or minimal offset between the forward and backward movements of the scanner mirror 4.

The same procedure may be repeated for each zoom factor (loop B in FIG. 4) so that, in the control unit 26, corresponding Fourier coefficients enabling calibrated scanning of an object 11 are stored for several zoom factors. Said zoom factors, i.e. the amplitude differences of the line grids 24, are respectively staggered by 1:1.6 to 1:2.

Further, by linear interpolation between the Fourier coefficients of adjacent zoom factors, optimal control conditions may be generated for any zoom factor lying between said zoom factors.

In order to calibrate the other scanner mirror 5, the test grid 17 is rotated through 90°. Optionally, a test grid comprising structures for both deflecting devices may be used.

Figure 5:
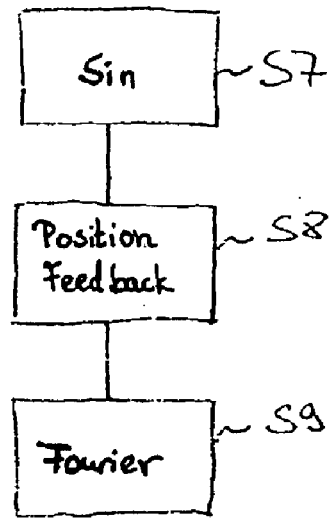
FIG. 5 shows a block diagram of part of a method for calibrating a laser scanning microscope.

The Fourier coefficients for rough correction may be obtained according to the scheme represented as a block diagram in FIG. 5. For this purpose, in a step S7, the scanner mirror 7 is driven by a sinusoidal control signal, with the frequency of the sinusoidal signal being varied over a wide frequency range. Then, in step S8, either by a position feedback provided at the scanner mirror or by suitable evaluation of the reflections at the grid lines, the response of the scanner mirrors to said sinusoidal control is detected.

Subsequently, in a step S9, a Fourier analysis is effected wherein the aforementioned odd-number Fourier coefficients are determined in amplitude and phase information, allowing a rough correction of the frequency response of the scanner mirror. The control signal is then distorted by means of said Fourier coefficients such that the movement of the scanner mirror is roughly approximated to the movement of an ideal scanner mirror being controlled by a triangular signal.

Such calibration allows the offset between forward and backward passes of each scanner mirror 4, 5 to be reduced to less than 0.2 pixels for an image format of 512×512 pixels; the position of the scanner mirror may be determined by detecting the position of the laser beam with a spatial resolution of $\geq 12$ bits.

The present invention may be embodied in other specific forms without departing from the spirit or essential attributes thereof, and it is, therefore, desired that the present embodiment be considered in all respects as illustrative and not restrictive.

What is claimed is:

1. A laser scanning microscopy method, wherein
   a laser beam is variably deflected about a deflection angle by controlling a deflecting device to create a variable deflection, in which the variable deflection enables an electro-optical zoom by varying a maximum deflection in which each different maximum deflection corresponds to a different zoom factor, characterized in that the deflection angle is measured by detecting the position of the laser beam downstream of the deflecting device, and the deflection angle is measured for several different zoom factors.

2. The laser scanning microscopy method as claimed in claim 1, characterized in that, for measurement of the deflection angle, a testing structure, which comprises at least one structural element, the position of said structural element being assigned to a predetermined deflection angle value, is arranged downstream of the deflecting device, and the deflection is set such that the laser beam is directed to the structural element and said deflection setting is assigned to the predetermined deflection angle value.

3. The laser scanning microscopy method as claimed in claim 2, characterized in that the testing structure comprises a plurality of line-type structural elements, which are equidistantly spaced from each other and arranged along a deflection direction, and that said deflection is adjusted along the deflection direction such that the laser beam is successively directed to the structural elements.

4. The laser scanning microscopy method as claimed in claim 2, characterized in that calibration of the deflecting device is effected using correlations between the deflection settings and the predetermined deflection angle values.

5. The laser scanning microscopy method as claimed in claim 3, characterized in that deflection of the reciprocating laser beam is effected successively at different frequencies, a frequency response of the deflecting device is determined from the correlations at the various frequencies and said frequency response is accordingly used for controlling the deflecting device.

6. The laser scanning microscopy method as claimed in claim 4, characterized in that, on the basis of said frequency response, Fourier coefficients are determined by means of Fourier analysis and the control of the deflecting device using said Fourier coefficients is effected in a reciprocating manner with a change in said deflection being uniform in time.

* * * * *